(12) United States Patent
Yasui

(10) Patent No.: US 10,118,480 B2
(45) Date of Patent: Nov. 6, 2018

(54) GRILLE SHUTTER MODULE

(71) Applicant: FALTEC Co., Ltd., Kawasaki-shi (JP)

(72) Inventor: Takeshi Yasui, Kawasaki (JP)

(73) Assignee: FALTEC CO., LTD., Kawasaki-shi (JP)

( * ) Notice: Subject to any disclaimer, the term of this patent is extended or adjusted under 35 U.S.C. 154(b) by 0 days.

(21) Appl. No.: 15/513,131

(22) PCT Filed: Nov. 2, 2015

(86) PCT No.: PCT/JP2015/080916
§ 371 (c)(1),
(2) Date: Mar. 21, 2017

(87) PCT Pub. No.: WO2016/103919
PCT Pub. Date: Jun. 30, 2016

(65) Prior Publication Data
US 2017/0291485 A1    Oct. 12, 2017

(30) Foreign Application Priority Data
Dec. 26, 2014    (JP) .................................. 2014-264232

(51) Int. Cl.
*B60K 11/08* (2006.01)
(52) U.S. Cl.
CPC .................................. *B60K 11/085* (2013.01)
(58) Field of Classification Search
CPC ......................................... B60K 11/08–11/085
See application file for complete search history.

(56) References Cited

U.S. PATENT DOCUMENTS

| | | | |
|---|---|---|---|
| 8,164,511 B2* | 4/2012 | Kishida ................. | G01S 13/345 342/103 |
| 9,828,036 B2* | 11/2017 | Frayer .................. | B62D 25/082 |
| 2010/0243352 A1* | 9/2010 | Watanabe ............ | B60K 11/085 180/68.1 |
| 2011/0047784 A1* | 3/2011 | Ohtake .................... | H01Q 1/42 29/600 |
| 2012/0119961 A1* | 5/2012 | Mayer Pujadas ..... | B60R 13/005 343/713 |
| 2013/0081785 A1* | 4/2013 | Yoo ....................... | B60K 11/085 165/96 |
| 2013/0223980 A1 | 8/2013 | Pastrick et al. | |
| 2014/0216834 A1* | 8/2014 | Elliott .................. | B60K 11/085 180/68.1 |
| 2014/0288760 A1* | 9/2014 | Asano .................. | B60K 11/085 701/29.2 |

(Continued)

FOREIGN PATENT DOCUMENTS

| | | |
|---|---|---|
| CN | 102005647 A | 4/2011 |
| CN | 102050008 A | 5/2011 |

(Continued)

OTHER PUBLICATIONS

International Search and Written Opinion Report dated Jan. 26, 2016 for PCT Application No. PCT/JP2015/080916.

(Continued)

*Primary Examiner* — Erez Gurari
(74) *Attorney, Agent, or Firm* — Moser Taboada

(57) ABSTRACT

A grill shutter module includes a radar unit which radiates radio waves toward a front, a rotatable flap disposed on a side of the radar unit, an actuator disposed behind the radar unit, and a power transmission part configured to connect the actuator and the flap to transmit power from the actuator to the flap.

2 Claims, 3 Drawing Sheets

(56) References Cited

U.S. PATENT DOCUMENTS

| | | | | |
|---|---|---|---|---|
| 2014/0335778 | A1* | 11/2014 | Takanaga | F24F 7/00 454/333 |
| 2014/0370795 | A1* | 12/2014 | Klop | B60H 1/242 454/75 |
| 2015/0140259 | A1* | 5/2015 | Sugiura | B32B 3/30 428/72 |
| 2015/0158376 | A1* | 6/2015 | Ehrenberg | B60K 11/085 180/68.1 |
| 2015/0159541 | A1* | 6/2015 | Solazzo | B60K 11/085 73/114.68 |
| 2017/0050509 | A1* | 2/2017 | Aizawa | B60K 11/085 |
| 2017/0144710 | A1* | 5/2017 | Frayer | B62D 25/082 |
| 2017/0248066 | A1* | 8/2017 | Wolf | B60K 11/085 |
| 2017/0291485 | A1* | 10/2017 | Yasui | B60K 11/085 |

FOREIGN PATENT DOCUMENTS

| | | |
|---|---|---|
| CN | 102198793 A | 9/2011 |
| CN | 102328628 A | 1/2012 |
| CN | 103273899 A | 9/2013 |
| CN | 203186081 U | 9/2013 |
| CN | 103707830 A | 4/2014 |
| EP | 1925947 A1 | 5/2008 |
| JP | 2002131413 A | 5/2002 |
| JP | 2003202369 A | 7/2003 |
| JP | 2008260447 A | 10/2008 |
| JP | 2013133059 A | 7/2013 |
| JP | 2013226924 A | 11/2013 |
| JP | 2014024474 A | 2/2014 |

OTHER PUBLICATIONS

Japanese Office Action dated Apr. 28, 2017 for Application No. 2014264232.

Chinese First Office Action dated Sep. 21, 2017 for Application No. 201580050791.1.

Extended European Search Report dated Jan. 23, 2018 for Application No. 15872488.0.

* cited by examiner

GRILLE SHUTTER MODULE

TECHNICAL FIELD

The present invention relates to a grille shutter module. Priority is claimed on Japanese Patent Application No. 2014-264232, filed Dec. 26, 2014, the content of which is incorporated herein by reference.

BACKGROUND ART

In recent years, in order to improve fuel efficiency performance or the like of a vehicle, in some cases, a grille shutter has been provided to a bumper opening provided on a front surface of a vehicle (for example, Patent Document 1). Such a grille shutter includes a plurality of flaps and actuators for rotating the flaps, and adjusts the flow rate of the outside air flowing into an engine compartment through the bumper opening.

PRIOR ART DOCUMENTS

Patent Documents

[Patent Document 1] Japanese Unexamined Patent Application, First Publication No. 2013-226924

SUMMARY OF THE INVENTION

Problems to be Solved by the Invention

Meanwhile, in recent years, a radar unit for detecting surrounding obstacles and the like has been mounted on a vehicle. Such a radar unit obtains a distance or the like to an obstacle, by radiating radio waves such as millimeter waves and detecting the reflected waves thereof. When mounting both the radar unit and the grill shutter on a vehicle, if the radar unit and the grill shutter are provided at different positions, a limited space on a front surface of the vehicle is mostly divided into the radar unit and the grill shutter. For this reason, the radar unit and the grill shutter may be disposed to overlap each other when viewed from the front surface side of the vehicle.

However, if a complicated mechanism of the grill shutter is disposed in front of the radar unit, there is a risk of hindering the progress of the radio waves of the radar unit. Therefore, when disposing the radar unit and the grille shutter to overlap each other as seen from the side in front of the vehicle, disposing the radar unit in front of the grill shutter may be conceived. However, in such a case, since the radar unit protrudes forward with respect to the grill shutter, an exterior design may be impaired. Further, if the radar unit is disposed so as not to protrude from the vehicle body, since a flap of the grill shutter or a frame for supporting the flap may be disposed such that it enters the inside of the engine room, the space of the engine room is pressed.

Adopting a configuration in which an actuator of the grille shutter is disposed such that it is displaced laterally from the center as shown in Patent Document 1 may be conceived. In this way, by providing the actuator at a position displaced from the center, the radar unit can be disposed in the empty space. In such a case, since the actuator is disposed with respect to a flow passage of the outside air, the flow passage area may decrease. When the flow passage area decreases, since the flow rate of the outside air that flows into the flow passage decreases, there is a risk of the cooling performance or the like of the radiator deteriorating.

The present invention has been made in consideration of the aforementioned problems, and an object thereof is to prevent the forward protrusion of the radar unit, while preventing the flow passage of the outside air from becoming smaller, when mounting both features of the radar unit and the grill shutter.

Means for Solving the Problems

The present invention adopts the following configuration as a means for solving the aforementioned problem.

A grill shutter module according to an aspect of the present invention includes a radar unit which radiates radio waves toward a front; a rotatable flap disposed on a side of the radar unit; an actuator disposed behind the radar unit; and a power transmission part configured to connect the actuator and the flap to transmit power from the actuator to the flap.

The power transmission part may include a bracket that is movable in an up-down direction by the actuator, and a link part which connects the bracket and a rotary shaft of the flap.

The radar unit may include a guide part which guides the bracket in the up-down direction.

The radar unit may further include a plurality of flaps and a plurality of link parts, wherein the plurality of link parts may be connected to the bracket.

Effects of the Invention

According to the aforementioned aspect of the present invention, since the flap is disposed on the side of the radar unit, the radar unit and the flap can be disposed to be substantially flush with the front surface of the grill shutter module. Therefore, it is possible to prevent the radar unit from protruding forward. Furthermore, in the aforementioned aspect of the present invention, the actuator for rotating the flap is disposed behind the radar unit, and the actuator is connected to the flap by the power transmission part. Therefore, the actuator is hidden behind the radar unit when viewed from the side in front of the vehicle, and it is possible to prevent the flow passage of the outside air from becoming smaller.

EMBODIMENTS FOR CARRYING OUT THE INVENTION

Hereinafter, a grille shutter module according to an embodiment of the present invention will be described with reference to the drawings. In the following drawings, in order to set each member to a recognizable size, the scale of each member is appropriately changed.

Figure 1:
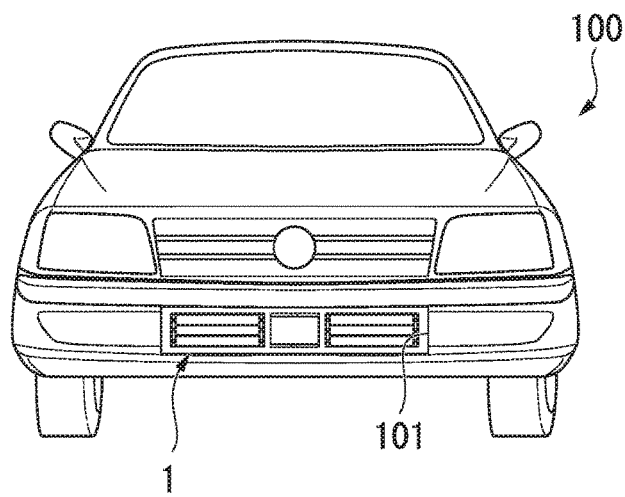
FIG. 1 is a front view of a vehicle including a grille shutter module according to an embodiment of the present invention.

FIG. 1 is a front view of a vehicle 100 including a grille shutter module 1 according to the embodiment.

As shown in FIG. 1, on a front surface of the vehicle 100, a bumper opening 101 for taking the outside air into the engine room is provided. The grill shutter module 1 according to the present embodiment is provided in the bumper opening 101. In the following description, an up-down direction refers to a vertical direction, a top refers to an upper side in the vertical direction, and a bottom refers to a lower side in the vertical direction. In addition, a front-back direction is a front-rear direction of the vehicle 100, a front refers to a side in front of the vehicle, and a rear refers to a side behind the vehicle. Further, a left-right direction is a width direction of the vehicle, and a side direction refers to a direction toward the outside of the vehicle in the left-right direction.

Figure 2:
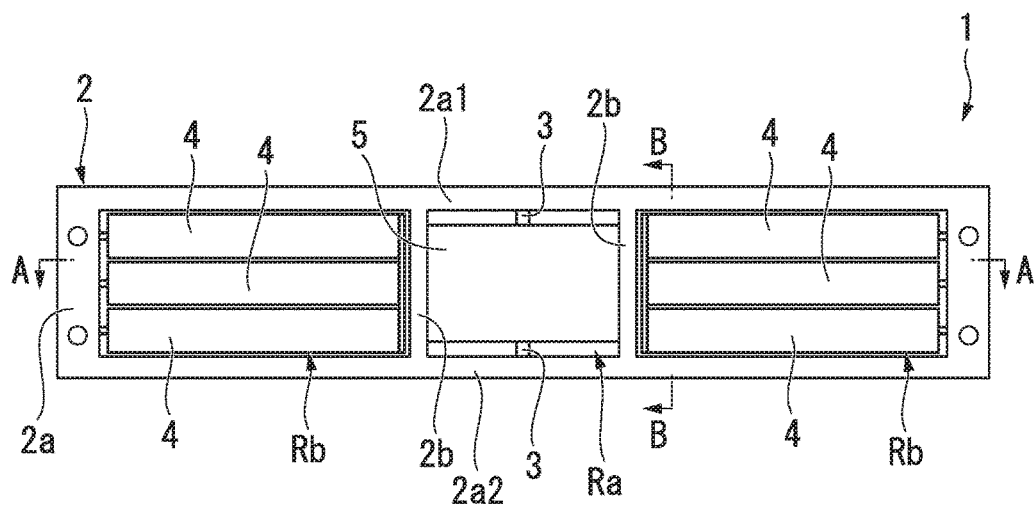
FIG. 2 is a front view of the grille shutter module according to an embodiment of the present invention.
Figure 3:
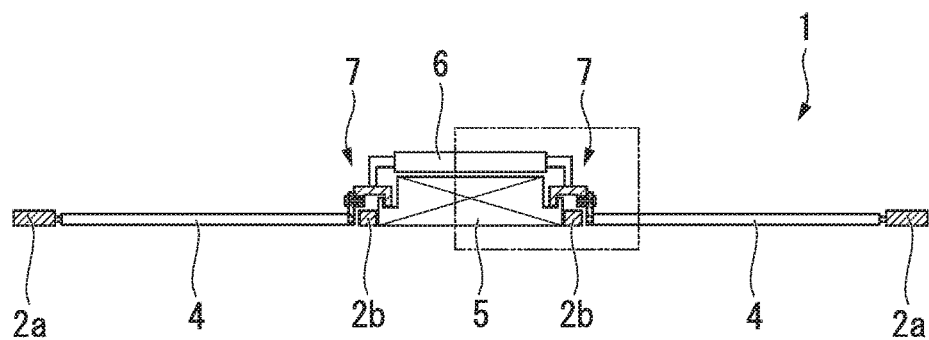
FIG. 3 is a cross-sectional view taken along a line A-A in FIG. 2.
Figure 4:
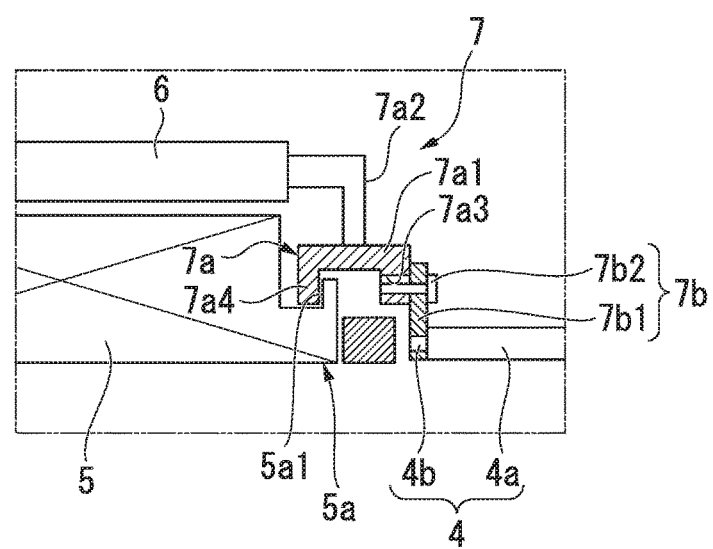
FIG. 4 is a partial enlarged view of FIG. 3.
Figure 5:
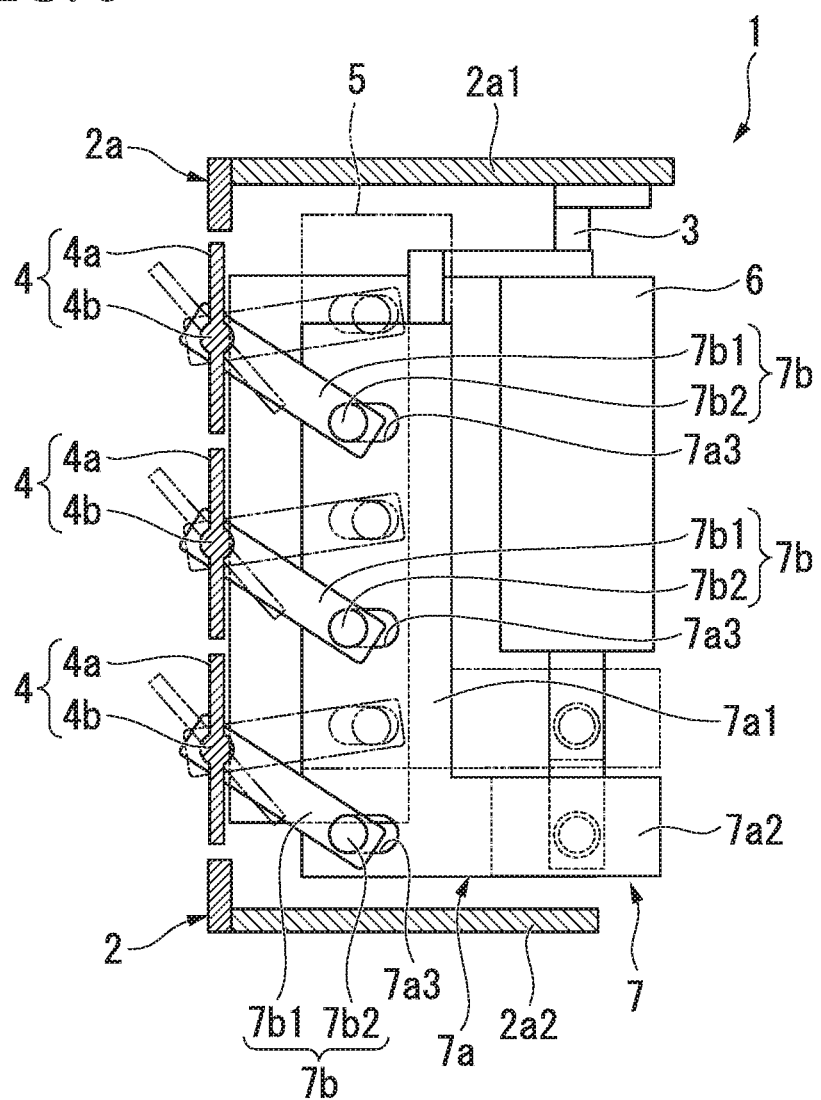
FIG. 5 is a cross-sectional view taken along a line B-B of FIG. 2.

FIG. 2 is a front view of the grille shutter module I according to the present embodiment. FIG. 3 is a cross-sectional view taken along a line A-A in FIG. 2. Further, FIG. 4 is a partial enlarged view of FIG. 3. FIG. 5 is a cross-sectional view taken along a line B-B of FIG. 2. As shown in FIGS. 2 to 5, the grill shutter module 1 according to the present embodiment includes a frame 2, a support part 3, a flap 4, a radar unit 5, an actuator 6, and a power transmission part 7.

The frame 2 includes an outer edge portion 2a and two columns 2b. The outer edge portion 2a is an annular portion that is provided along the edge of the bumper opening 101, and is fixed to the vehicle body. As shown in FIG. 5, the outer edge portion 2a is provided such that an upper portion 2a1 and a lower portion 2a2 extend toward the rear side (i.e., the engine room side) of the vehicle to connect the support part 3 and the like. The column 2b is a part extending in the up-down direction, and two columns 2b are provided and separated from each other in the vehicle width direction. As shown in FIG. 2, by the columns 2b, a region surrounded by the outer edge portion 2a is divided into a central region Ra and two side regions Rb disposed to sandwich the central regions Ra from the vehicle width direction. The frame 2 directly or indirectly supports the support part 3, the flap 4, the radar unit 5, the actuator 6 and the power transmission part 7.

The support part 3 is fixed to the upper portion 2a1 of the outer edge portion 2a, and supports the radar unit 5 and the actuator 6. As shown in FIG. 5, the flap 4 is provided with a wing part 4a, and a rotary shaft 4b disposed at a central portion of the wing part 4a. The flap 4 extends in the vehicle width direction, one end portion of the rotary shaft 4b is fixed to the power transmission part 7, and the other end portion of the rotary shaft 4b is pivotally supported on a side portion of the outer edge portion 2a. The flap 4 is rotatable about the rotary shaft 4b when the rotational power is transmitted from the power transmission part 7. As shown in FIG. 2, three flaps 4 are arranged vertically in each of the side regions Rb. All the flaps 4 are synchronously rotated by the power transmission part 7, and have a closed attitude in which the wing part 4a closes the bumper opening 101, an open attitude in which the bumper opening 101 is open, or an intermediate attitude thereof.

The radar unit 5 is supported by the support part 3 and is disposed between the columns 2b of the frame 2. That is, as shown in FIG. 2, the radar unit 5 is disposed in the central region Ra. Such a radar unit 5 radiates radio waves in front of the vehicle and receives the reflected waves, thereby detecting an obstacle or the like in front of the vehicle.

Further, as shown in FIG. 4, the radar unit 5 is provided with a guide part 5a provided to protrude sideways with respect to the housing. The guide part 5a is provided on both sides of the radar unit 5, and each guide part 5a is provided to extend in the up-down direction. The guide parts 5a have guide grooves 5a1 to which a bracket 7a of a power transmission part 7 to be described later is slidably connected. The guide groove 5a1 guides the bracket 7a so that the bracket 7a can move up and down (move in the up-down direction). The guide groove 5a1 of the guide part 5a opens rearward. The bracket 7a connected to the guide groove 5a1 can be moved up and down, but the movement in the horizontal direction is restricted by the guide part 5a.

The actuator 6 is supported by the support part 3 and is disposed behind the radar unit 5. That is, in the present embodiment, the actuator 6 is disposed behind the radar unit 5 at a position that is hidden by the radar unit 5 as viewed from the side in front of the vehicle. The actuator 6 includes a servo motor, a solenoid, or the like as a drive source, and generates power for rotating the flap 4 under the control of the engine control unit. In the present embodiment, the actuator 6 has a mechanism in which a portion connected to the protruding part 7a2 of the bracket 7a expands and contracts in the up-down direction in accordance with a signal which is output from the outside.

As shown in FIG. 3, each of the power transmission parts 7 are provided on both sides of the actuator 6.

That is, in the present embodiment, two power transmission parts 7 are provided to a single actuator 6. Since these power transmission parts 7 have the same configuration other than having bilateral symmetry, only the power transmission part 7 on one side will be explained here.

The power transmission part 7 includes a bracket 7a and a link part 7b. As shown in FIG. 5, the bracket 7a includes a base part 7a1 and a protruding part 7a2. A link part 7b is connected to the base part 7a1. The protruding part 7a2 includes a portion which protrudes rearward from the lower end of the base part 7a1, and a portion which is bent from the front end portion of the portion protruding rearward and is fixed to the actuator 6. Three long holes 7a3 extending in the front-rear direction are disposed in the base part 7a1 in the up-down direction. These long holes 7a3 are parts into which link pins 7b2 to be described later of the link part 7b are inserted. The link pins 7b2 inserted into the long holes 7a3 can move inside the long hole 7a3 in the front-rear direction.

Further, as shown in FIG. 4, the bracket 7a is provided with a protruding piece 7a4 that is slidably inserted into the guide groove 5a1. The protruding piece 7a4 includes a portion that protrudes from the base part 7a1 toward the center of the vehicle in the left-right direction, and a portion that is bent from the tip end portion of the protruding portion and is inserted into the guide groove 5a1 of the guide part 5a. In this manner, the bracket 7a is slidably connected to the radar unit 5 by inserting the tip end portion of the protruding piece 7a4 into the guide groove 5a1.

The link part 7b includes a link rod 7b1 and a link pin 7b2. The link rod 7b1 is a rod member that is fixed to the rotary shaft 4b of each flap 4 at its front end portion and extends rearward. Further, as described above, in the present embodiment, three flaps 4 are disposed in one side region Rb (see FIG. 2). Therefore, three link rods 7b1 are also provided. The link pin 7b2 is a pin member that protrudes in a horizontal direction from the rear end portion of the link rod 7b1 in the vehicle width direction, and is inserted into the long hole 7a3 provided in the base part 7a1 of the bracket 7a.

The link part 7b connects the bracket 7a and the rotary shaft 4b of the flap 4, and converts the up-down movement of the bracket 7a moved up and down by the actuator 6 into the rotational movement of the flap 4. That is, when the bracket 7a is moved up and down, the rear end portion of the link rod 7b1 is moved up and down, while the link pin 7b2 moves in the long hole 7a3, and the link rod 7b1 is rotated about the tip end portion, accordingly. As a result, the rotary shaft 4b of the flap 4 fixed to the tip end portion of the link rod 7b1 rotates, and the flap 4 rotates.

In the grill shutter module 1 according to the present embodiment having such a configuration, radio waves are radiated in front of the vehicle by the radar unit 5 disposed on the front surface, and obstacles and the like are detected by the reflected waves. Further, the actuator 6 is driven under the control of the engine control unit. The flap 4 is rotated, accordingly, and the flow rate of the outside air flowing into the bumper opening 101 is adjusted.

With the grill shutter module 1 according to the present embodiment, the flap 4 is disposed on the side of the radar unit 5. Therefore, it is possible to dispose the radar unit 5 and the flap 4 to be substantially flush with the front surface of the grill shutter module 1. Therefore, it is possible to prevent the radar unit 5 from protruding forward.

Furthermore, in the grill shutter module 1 according to the present embodiment, the actuator 6 for rotating the flap 4 is disposed behind the radar unit 5, and the actuator 6 is connected to the flap 4 by the power transmission part 7. Therefore, according to the grille shutter module 1 of the present embodiment, the actuator 6 is hidden behind the radar unit 5 when viewed from the side in front of the vehicle, and therefore it is possible to prevent the flow passage of the outside air from becoming smaller.

Further, in the grill shutter module 1 according to the present embodiment, the power transmission part 7 includes a bracket 7a that is moved up and down by the actuator 6, and a link part 7b that connects the bracket 7a and the rotary shaft of the flap 4. Therefore, it is possible to transmit power from the actuator 6 disposed behind the radar unit 5 to the flap 4 with a simple structure.

Further, in the grill shutter module 1 according to the present embodiment, the radar unit 5 is provided with a guide part 5a which guides the upward and downward movements of the bracket 7a. In the grill shutter module 1 according to the present embodiment, the actuator 6 is disposed to be displaced rearward with respect to the flap 4, and the actuator 6 and the flap 4 are connected to each other via the power transmission part 7 having the link rod 7b1 and the like. It is thought that, as compared with a case where the actuator 6 is directly connected to the flap 4, in such a configuration, the transmission efficiency of the power from the actuator 6 to the flap 4 is deteriorated, due to an increase in friction resistance caused by bending or inclination of the member such as the link rod 7b1. In contrast, according to the grille shutter module 1 of the present embodiment, the movement of the bracket 7a in the vehicle width direction is restricted by the guide part 5a. Therefore, the power transmission part 7 can be smoothly moved, and it is possible to prevent deterioration of the transmission efficiency of power from the actuator 6 to the flap 4.

Furthermore, in the grill shutter module 1 according to the present embodiment, a plurality of flaps 4 and a plurality of link parts 7b are provided, and the plurality of link parts 7b are connected to the bracket 7a. Therefore, since a single bracket 7a is provided to a plurality of (three in the present embodiment) flaps 4, the number of components can be reduced as compared with the case where a bracket is provided to each flap 4.

In addition, in the grille shutter module 1 according to the present embodiment, the actuator 6 is disposed at the center of the left and right flaps 4 as viewed from in front of the vehicle. Therefore, it is possible to transmit the power to the left and right flaps 4 in a well-balanced manner, for example, as compared with a case where the actuator 6 is disposed so as to be deviated in one of left and right directions. That is, it is possible to synchronize the rotation of the left and right flaps 4 with high precision.

Although the preferred embodiments of the present invention have been described above with reference to the accompanying drawings, the present invention is not limited to the aforementioned embodiments. The shapes and combinations of the constituent members shown in the aforementioned embodiments are merely examples, and various modifications can be made based on design requirements or the like, without departing from the gist of the present invention.

For example, in the aforementioned embodiment, the configuration in which the power transmission part 7 includes the bracket 7a and the link part 7b has been adopted. However, the present invention is not limited thereto, and it is also possible to adopt a configuration in which the power transmission part 7 has another mechanism (e.g., a cam mechanism).

Further, in the above embodiment, the configuration in which the radar unit 5 is disposed at the center in the vehicle width direction of the vehicle has been adopted. However, the present invention is not limited thereto, and it is also possible to adopt a configuration in which the radar unit 5 is disposed such that it is displaced from the center in the vehicle width direction of the vehicle.

Even in this case, the actuator 6 is disposed behind the radar unit 5. That is, similarly to the radar unit 5, the actuator 6 is also disposed such that it is displaced from the center in the vehicle width direction of the vehicle.

Further, in the above-described embodiment, the configuration in which the guide part 5a includes the guide groove 5a1 has been described. However, the present invention is not limited thereto, and it is also possible to adopt a configuration in which the guide part 5a has a guide rail and the bracket 7a has a groove connected to the guide rail.

Further, in the above-described embodiment, the configuration in which the guide part 5a is provided to the radar unit 5 has been described. However, the present invention is not limited thereto. For example, it is also possible to adopt a configuration in which a guide portion is provided to the frame 2. When the restriction in shape or the like of the frame 2 is less than that of the radar unit 5, it is preferable to provide a guide part for the frame 2.

Further, in the above-described embodiment, the description has been given of a case where the grill shutter is provided to the bumper opening 101 provided on the front surface of the vehicle 100. However, the present invention is not limited thereto. For example, it is also possible to provide the grill shutter 1 to the grill opening provided on the front surface of the vehicle 100. In this case, it is also possible to provide an emblem (radome) that is capable of transmitting radio waves in front of the radar unit.

DESCRIPTION OF REFERENCE NUMERAL

1 Grille shutter module 2 Frame 3 Support part 4 Flap 4a Wing part 4b Rotary shaft 5 Radar unit 5a Guide part 6 Actuator 7 Power transmission part 7a Bracket 7b Link part 100 Vehicle

The invention claimed is:
1. A grill shutter module comprising:
a radar unit which radiates radio waves toward a front;
a rotatable flap disposed on a side of the radar unit;

an actuator disposed behind the radar unit; and
a power transmission part configured to connect the actuator and the flap to transmit power from the actuator to the flap, wherein
the power transmission part comprises a bracket which is movable in an up-down direction by the actuator, and a link part which connects the bracket and a rotary shaft of the flap, and
the radar unit comprises a guide part which guides the movement of the bracket in the up-down direction.

2. The grill shutter module according to claim 1, comprising:
a plurality of flaps and a plurality of link parts, wherein the plurality of link parts are connected to the bracket.

* * * * *